US007660219B2

United States Patent
Yen

(10) Patent No.: US 7,660,219 B2
(45) Date of Patent: Feb. 9, 2010

(54) WRITE ADJUSTMENT METHOD

(75) Inventor: Sheng-Hsien Yen, Taipei (TW)

(73) Assignee: Via Technologies Inc., Hsin-Tien, Taipei (TW)

( * ) Notice: Subject to any disclaimer, the term of this patent is extended or adjusted under 35 U.S.C. 154(b) by 467 days.

(21) Appl. No.: 11/758,700

(22) Filed: Jun. 6, 2007

(65) Prior Publication Data

US 2008/0056082 A1  Mar. 6, 2008

Related U.S. Application Data

(60) Provisional application No. 60/824,086, filed on Aug. 31, 2006.

(51) Int. Cl.
*G11B 7/00* (2006.01)

(52) U.S. Cl. .................................. 369/47.53

(58) Field of Classification Search ........................ None
See application file for complete search history.

(56) References Cited

U.S. PATENT DOCUMENTS 5,303,217 A * 4/1994 Bakx et al. ............... 369/47.53
5,559,785 A * 9/1996 Honda et al. .............. 369/59.12
6,646,968 B1 * 11/2003 Miyaoka ................... 369/53.31
7,391,687 B2 * 6/2008 Toshiaki et al. .......... 369/47.53

* cited by examiner

*Primary Examiner*—Joseph H Feild
*Assistant Examiner*—Christopher R Lamb
(74) *Attorney, Agent, or Firm*—Thomas, Kayden, Horstemeyer & Risley

(57) ABSTRACT

A write adjustment method adjusts recording power, recording time, and recording position of a recorder. The recorder includes a light detecting chip to receive a reflected light signal and generate a recording detection signal to a high pass filter. The high pass filter receives the recording detection signal and outputs a filtering signal. The write adjustment method includes writing first short period data to a disk, acquiring a reference voltage of the high pass filter according to a maximum value and a minimum value of the filtering signal, writing first mixing period data to the disk according to a plurality of predetermined recording times, acquiring a first maximum value and a first minimum value according to the filtering signal and adjusting and determining a first recording power of the recorder when a target value is achieved according to the first maximum value, the first minimum value and the reference voltage of the high pass filter.

18 Claims, 4 Drawing Sheets

WRITE ADJUSTMENT METHOD

CROSS-REFERENCE TO RELATED APPLICATION

This application claims the benefit of U.S. provisional application Ser. No. 60/824,086, filed Aug. 31, 2006 and entitled "WRITE STRATEGY AUTO ADJUSTMENT FOR DVDR", which is incorporated herein by reference.

BACKGROUND OF THE INVENTION

1. Field of the Invention

The invention relates to a write adjustment method, and in particular relates to a write adjustment method by adjusting recording power, recording time, and recording position.

2. Description of the Related Art

DVD-ROM drive manufacturers conventionally test popular disks in advance to decide write strategies for different disks. For example, the strategies relate to adjustment of recording power, recording time, and recording position. However, due to the presence of many kinds of disks in the market, not all disk types can be tested. Moreover, disks may be produced later than the DVD-ROM drives. Designers can not pretest these disks in advance to decide write strategies for these disks. Consequently, drives may have no write strategies for such untested disks and revert to normal write strategies for recording. Problems in writing or reading of the disks can result.

BRIEF SUMMARY OF THE INVENTION

A detailed description is given in the following embodiments with reference to the accompanying drawings.

An embodiment of a write adjustment method is provided. A write adjustment method adjusts the recording power, recording time, and recording position of a recorder. The recorder includes a light detecting chip to receive a reflected light signal and generates a recording detection signal to a high pass filter. The high pass filter receives the recording detection signal and outputs a filtering signal. The write adjustment method includes writing first short period data to a disk, acquiring a reference voltage of the high pass filter according to a maximum value and a minimum value of the filtering signal, writing a first mixing period data to the disk according to a plurality of preset recording times and acquiring a first maximum value and a first minimum value according to the filtering signal, and adjusting and deciding a first recording power of the recorder to acquire an operating result of the first maximum value, the first minimum value, and the reference voltage as a target value.

Another embodiment of a write adjustment method is provided. A write adjustment method adjusts the recording power, recording time, and recording position of a recorder. The recorder includes a light detecting chip to receive a reflected light signal and generates a recording detection signal to a high pass filter. The high pass filter receives the recording detection signal and outputs a filtering signal. The write adjustment method includes writing a first short period data to a disk, acquiring a reference voltage of the high pass filter according to a maximum value and a minimum value of the filtering signal, writing a first mixing period data to the disk according to a plurality of preset recording times and acquiring a first maximum value and a first minimum value according to the filtering signal, adjusting and deciding a first recording power of the recorder to acquire an operating result of the first maximum value, the first minimum value, and the reference voltage as a target value, writing a second mixing period data to the disk according to the first recording power and acquiring a second maximum value and a second minimum value according to the filtering signal, adjusting and deciding a first recording time of the recorder to acquire an operating result of the second maximum value, the second minimum value, and the reference voltage as the target value, writing a third mixing period data to the disk according to the first recording power, the preset recording time and the first recording time, and adjusting and deciding a first recording position of the third mixing period data to acquire a jitter value of the filtering signal below a first threshold value or to a minimum value. If writing second mixing period data to the disk according to the first recording time, the preset recording time and the first recording power cannot acquire an operating result of the second maximum value, the second minimum value, and the reference voltage as the target value, increasing the first recording power to write a second short period data to the disk.

BRIEF DESCRIPTION OF THE DRAWINGS

The invention can be more fully understood by reading the subsequent detailed description and examples with references made to the accompanying drawings, wherein.

DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
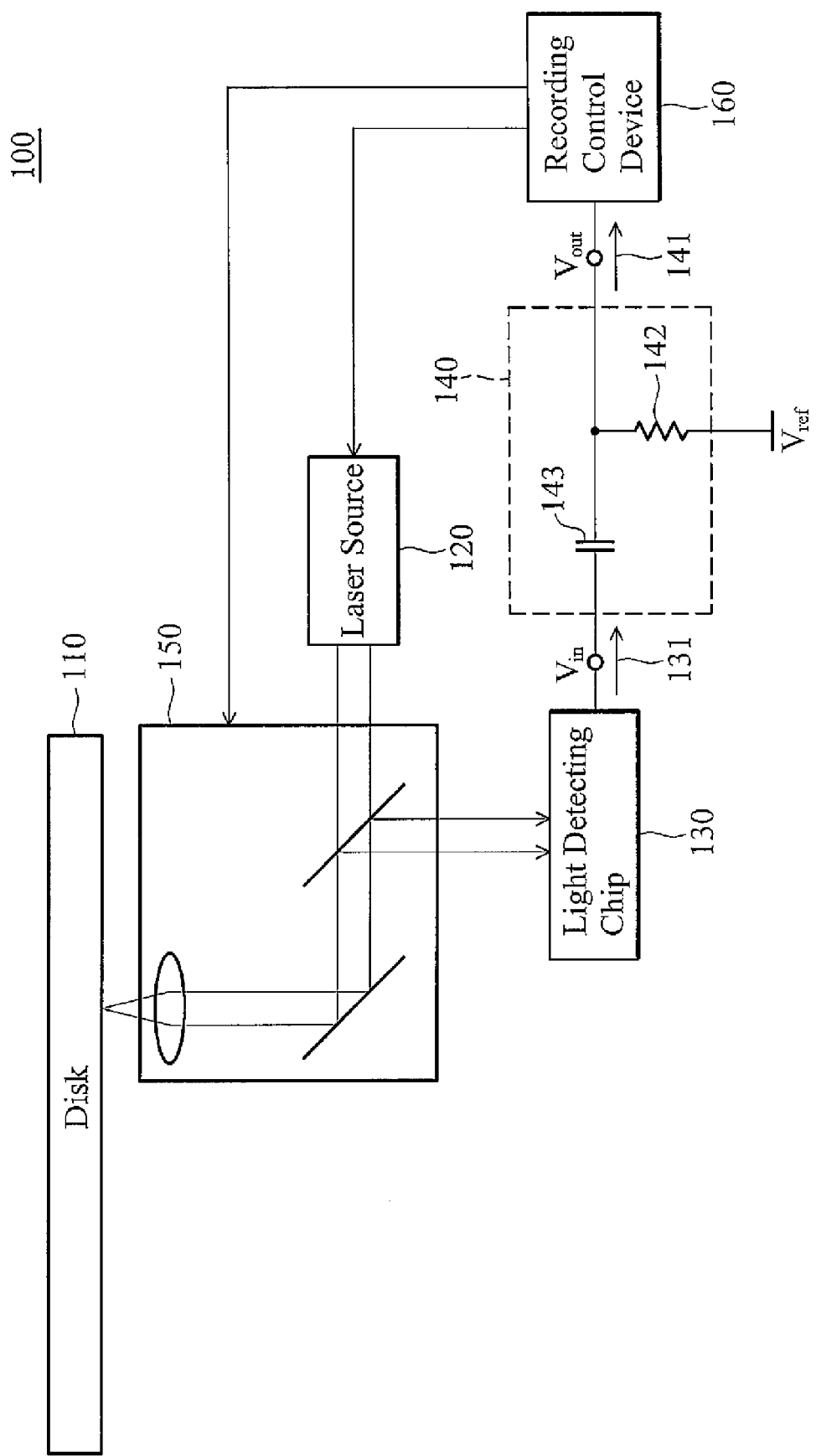
FIG. 1 is a schematic diagram of a recorder according to an embodiment of the invention.

FIG. 1 is a schematic diagram of recorder 100 according to an embodiment of the invention. Recorder 100 includes disk 110, laser source 120, light detecting chip 130, high pass filter 140, lens module 150 and recording control device 160. High pass filter 140 includes resistor 142 and capacitor 143. Capacitor 143 is coupled between input terminal $V_{in}$ and output terminal $V_{out}$ of high pass filter 140. Resistor 142 is coupled between output terminal $V_{out}$ of high pass filter 140 and reference voltage $V_{ref}$. When recorder 100 writes to disk 110 to determine the strategy, laser source 120 emits laser through lens module 150 to disk 110. At the same time, disk 110 reflects light through lens module 150 to light detecting chip 130. Light detecting chip 130 receives the reflected light and generates recording detection signal 131 to high pass filter 140. High pass filter 140 filters recording detection signal 131 to output filtering signal 141 to recording control device 160. Recording control device 160 controls laser source 120 and lens module 150 to adjust the recording power, recording time, and recording position according to filtering signal 141.

Figure 2:
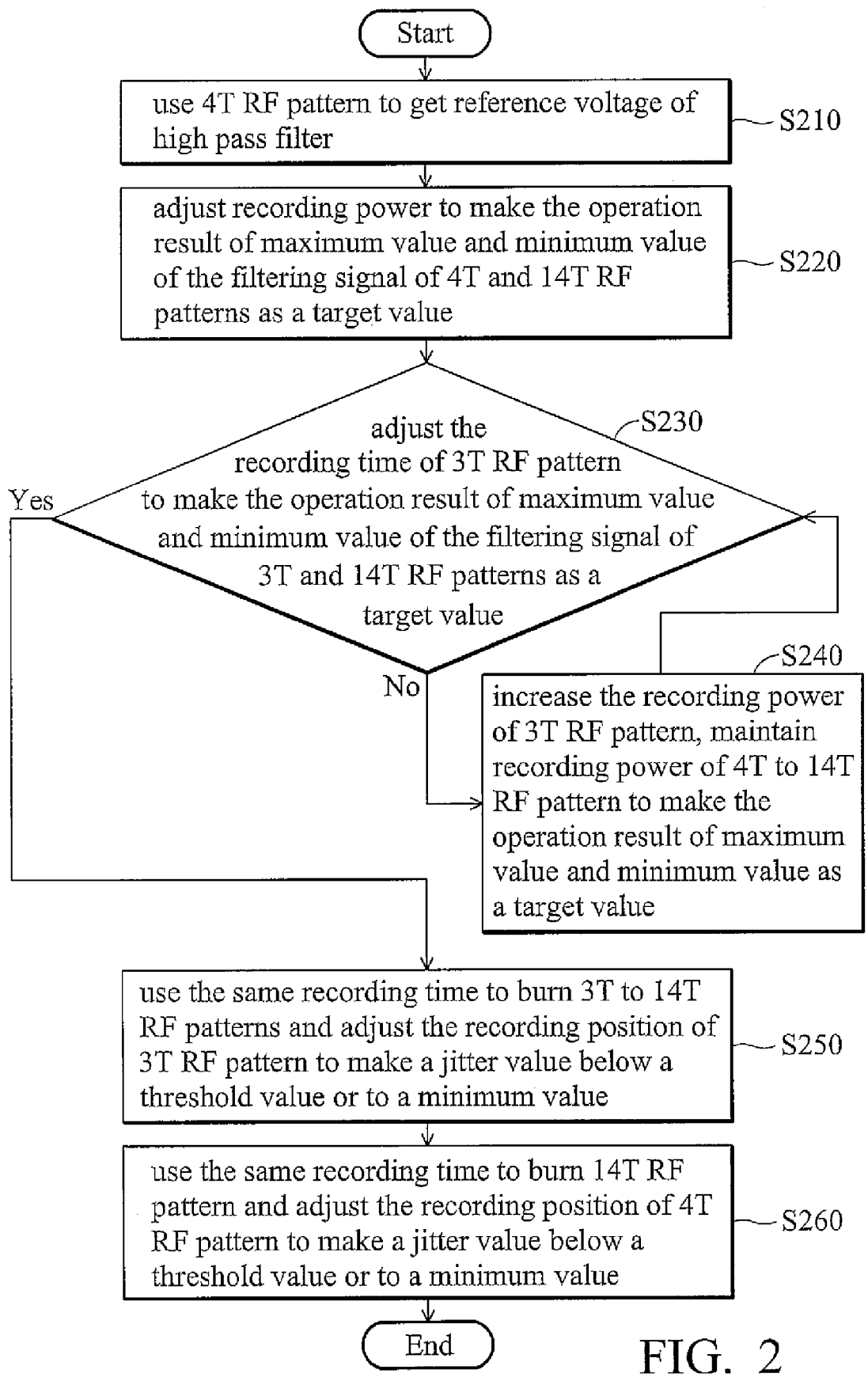
FIG. 2 is a flowchart of a write adjustment method according to an embodiment of the invention.
Figure 3:
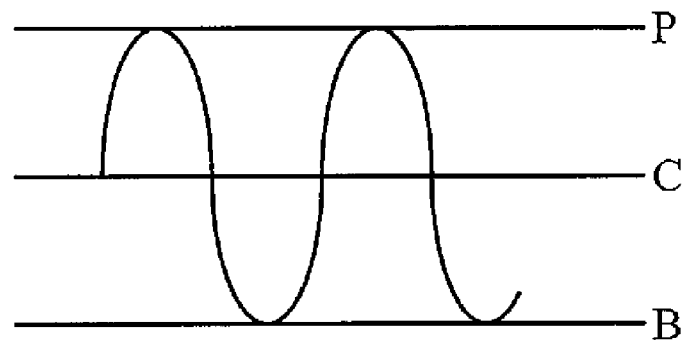
FIG. 3 shows a sine wave of a filtering signal according to an embodiment of the invention.

FIG. 2 is a flowchart of a write adjustment method according to an embodiment of the invention. According to the embodiment of the invention, when recorder 100 writes to disk 110, recorder 100 first writes test data to the disk for adjusting the recording power, recording time, and recording position. Referring to FIGS. 1 and 2 together, recorder 100 writes the first short period data, such as 4T RF pattern, to disk 110. Light detecting chip 130 receives the reflected light from disk 110 and generates recording detection signal 131 to high pass filter 140. High pass filter 140 receives recording detection signal 131 and outputs filtering signal 141 to recording control device 160. Recording control device 160 acquires reference voltage $V_{ref}$ of high pass filter 140 according to a maximum value and a minimum value of filtering signal 141 (step S210). Since recorder 100 writes short period data, such as 3T or 4T RF pattern, filtering signal 141 is a sine wave, as shown in FIG. 3. DC (Direct current) voltage C of filtering signal 141 is reference voltage $V_{ref}$ (C=$V_{ref}$). Recording control device 160 acquires DC voltage C (C=(P+B)/2) according to maximum value P and minimum value B of filtering signal 141.

Figure 4:
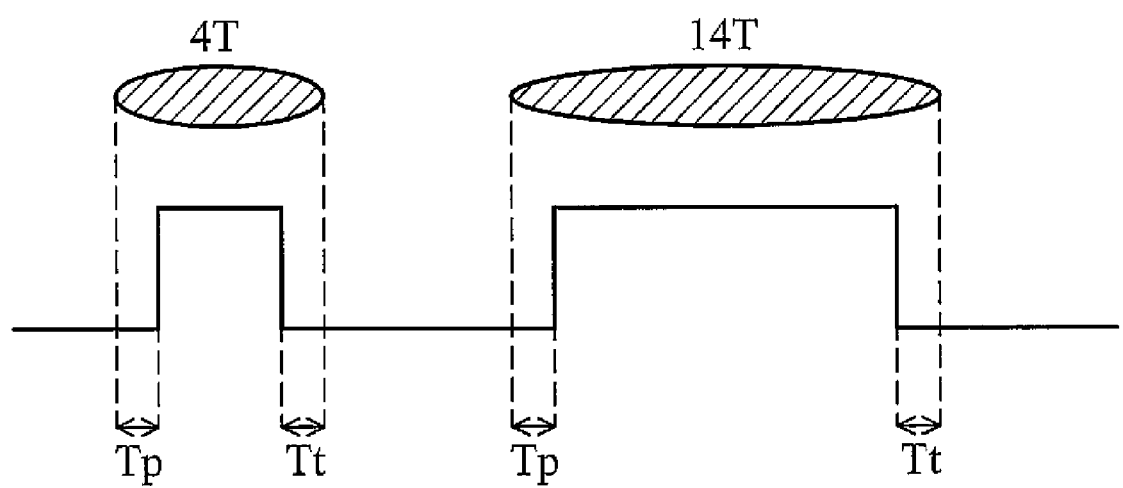
FIG. 4 is a schematic diagram of a recording time and real writing length to disk according to an embodiment of the invention.

FIG. 4 is a schematic diagram of a recording time and a real writing length to disk according to an embodiment of the invention. FIG. 4 uses writing lengths of 4T and 14T RF patterns as an example. According to an embodiment of the invention, recorder 100 first symmetrically writes each period RF pattern to disk 100. Thus, the lengths of recording blank periods $T_p$ and $T_t$ of each period RF pattern are the same. After, recorder 100 adjusts the recording position. In addition, if the recording power is strong, the recording time is shorter, and vice versa.

Recorder 100 presets a plurality of recording times of 4T, 14T RF patterns. Recorder 100 writes the first mixing period data (4T RF pattern+14T RF pattern) to disk 100 according to recording time of 4T and 14T RF patterns. Recording control device 160 acquires maximum value $P_1$ and minimum $B_1$ according to filtering signal 141. Recorder 100 acquires an optimum recording power $W_0$ by adjusting recording power to equal the operation result $(P_1-C)/(P_1-B_1)$ to 0.5 (step S220).

Recorder 100 then uses the optimum recording power $W_0$ to write the second mixing period data (3 RF pattern+14 RF pattern) to disk 110. Recording control device 160 acquires maximum value $P_2$ and minimum $B_2$ according to filtering signal 141. Recorder 100 acquires the optimum recording time $T_3$ of 3 RF pattern by adjusting recording time $T_3$ to equal $(P_2-C)/(P_2-B_2)$ to 0.5 (step S230). If using optimum recording time $T_3$ and optimum recording power $W_0$ to write the second mixing period data does not make the average of the maximum value and the minimum value equal to 0.5, recording power must be increased to the second optimum recording power $W_1$ ($W_1=W_0+\square W$, $\square W$ is from 0.5 mW to 1 mW.) to write 3T RF pattern to equal the operation result $(P_2-C)/(P_2-B_2)$ to 0.5, and still uses optimum recording power $W_0$ to write 4T to 14T RF patterns (step S240).

Recorder 100 then uses optimum recording power $W_0$ (or second optimum recording power $W_1$), a plurality of recording times of 4T to 14T RF patterns (the preset recording time of 4T and 14T RF patterns) and optimum recording time $T_3$ of 3T RF pattern to write the third mixing period data (3T to 14T RF patterns) to disk 110. Recorder 100 adjusts the recording position of 3T RF pattern to acquire a jitter value of filtering signal 141 below a threshold value or a minimum value. Recorder 100 determines the optimum recording position of 3T RF pattern (step S250). In an additional step, recorder 100 maintains the recording time of 4T RF pattern and only adjusts the recording position of 4T RF pattern to acquire the jitter value of filtering signal 141 below a threshold value or a minimum value for acquiring optimum recording position of 4T RF pattern (step S260).

Figure 5:
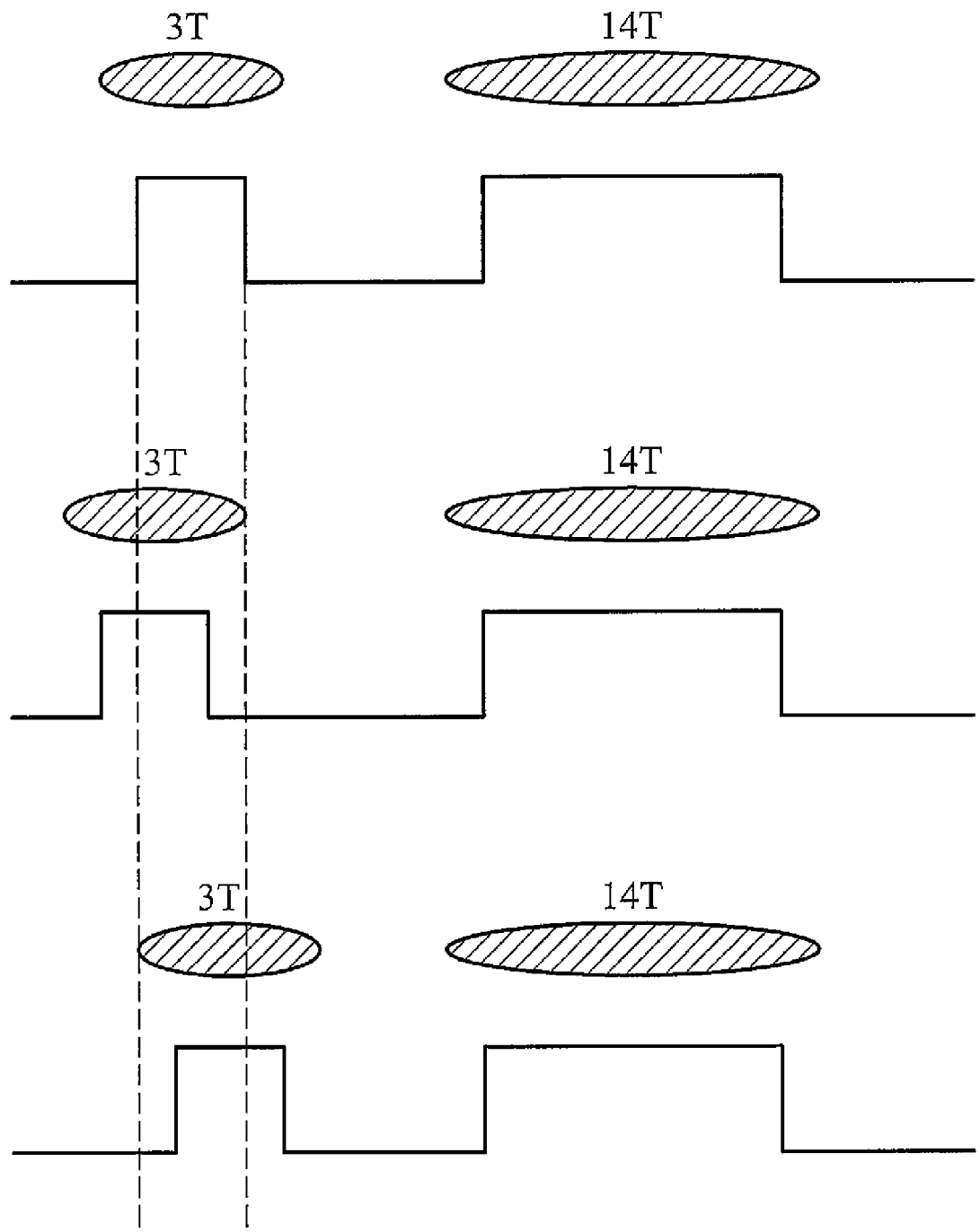
FIG. 5 is a schematic diagram of three different writing results according to an embodiment of the invention.

Recorder 100 adjusts the recording position to use an optimum recording power to write 3T RF pattern according to step S250 that the jitter value of filtering signal 141 is below a threshold or a minimum value. FIG. 5 is a schematic diagram of three different writing results according to an embodiment of the invention. In FIG. 5, these three writing results (3T RF pattern) have the same recording time but different recording positions. The optimum recording position of each writing result is different.

In addition, firmware can be used to finish the above steps. The invention allows automatic adjustment of unknown disk types to achieve superior performance.

While the invention has been described by way of example and in terms of preferred embodiment, it is to be understood that the invention is not limited to thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A write adjustment method for adjusting recording power, recording time, and recording position of a recorder, the recorder comprising a light detecting chip to receive a reflected light signal and generating a recording detection signal to a high pass filter, the high pass filter receiving the recording detection signal and outputting a filtering signal, comprising:
   writing first short period data to a disk;
   acquiring a reference voltage of the high pass filter according to a maximum value and a minimum value of the filtering signal;
   writing first mixing period data to the disk according to a plurality of preset recording times and acquiring a first maximum value and a first minimum value according to the filtering signal; and
   adjusting and deciding a first recording power of the recorder to acquire an operating result of the first maximum value, the first minimum value and the reference voltage as a target value.

2. The write adjustment method as claimed in claim 1, further comprising:
   writing second mixing period data to the disk according to the first recording power and acquiring a second maximum value and a second minimum value according to the filtering signal;
   adjusting and deciding a first recording time of the recorder to acquire an operating result of the second maximum value, the second minimum value and the reference voltage as the target value;
   writing third mixing period data to the disk according to the first recording power, the preset recording time and the first recording time; and
   adjusting and deciding a first recording position of the third mixing period data to acquire a jitter value of the filtering signal below a first threshold value or to a minimum value.

3. The write adjustment method as claimed in claim 2, wherein if writing the second mixing period data to the disk according to the first recording time, the preset recording time and the first recording power cannot acquire an operating result of the second maximum value, the second minimum value and the reference voltage as the target value, power is increased to write second short period data to the disk.

4. The write adjustment method as claimed in claim 2, further comprising:
  writing the first short period data to the disk according to the first recording power and the preset recording time; and
  adjusting and deciding a second recording position of the first short period data to make the jitter value of the filtering signal below a second threshold value or to a minimum value.

5. The write adjustment method as claimed in claim 1, wherein the high pass filter comprises:
  a resistor coupled between an output terminal and the reference voltage; and
  a capacitor coupled between an input terminal and the output terminal.

6. The write adjustment method as claimed in claim 1, wherein the target value is 0.5.

7. The write adjustment method as claimed in claim 1, wherein the first mixing period data is composed of a 4T RF pattern and 14T RF pattern.

8. The write adjustment method as claimed in claim 1, wherein the second mixing period data is composed of a 3T RF pattern and a 14T RF pattern.

9. The write adjustment method as claimed in claim 1, wherein the third mixing period data is composed of 3T to 14T RF patterns.

10. The write adjustment method as claimed in claim 1, wherein the first short period data is 4T RF pattern and the second short period data is 3T RF pattern.

11. A write adjustment method for adjusting recording power, recording time, and recording position of a recorder, the recorder comprising a light detecting chip to receive a reflected light signal and generating a recording detection signal to a high pass filter, the high pass filter receiving the recording detection signal and outputting a filtering signal, comprising:
  writing first short period data to a disk;
  acquiring a reference voltage of the high pass filter according to a maximum value and a minimum value of the filtering signal;
  writing first mixing period data to the disk according to a plurality of preset recording times and acquiring a first maximum value and a first minimum value according to the filtering signal;
  adjusting and deciding a first recording power of the recorder to acquire an operating result of the first maximum value, the first minimum value and the reference voltage as a target value;
  writing second mixing period data to the disk according to the first recording power and acquiring a second maximum value and a second minimum value according to the filtering signal;
  adjusting and deciding a first recording time of the recorder to acquire an operating result of the second maximum value, the second minimum value and the reference voltage as the target value;
  writing third mixing period data to the disk according to the first recording power, the preset recording time and the first recording time; and
  adjusting and deciding a first recording position of the third mixing period data to acquire a jitter value of the filtering signal below a first threshold value or to a minimum value;
  wherein if writing the second mixing period data to the disk according to the first recording time, the preset recording time and the first recording power cannot acquire an operating result of the second maximum value, the second minimum value and the reference voltage as the target value, increasing the first recording power to write second short period data to the disk.

12. The write adjustment method as claimed in claim 11, further comprising:
  writing the first short period data to the disk according to the first recording power and the preset recording time; and
  adjusting and deciding a second recording position of the first short period data to make the jitter value of the filtering signal below a second threshold value or to a minimum value.

13. The write adjustment method as claimed in claim 11, wherein the high pass filter comprises:
  a resistor coupled between an output terminal and the reference voltage; and
  a capacitor coupled between an input terminal and the output terminal.

14. The write adjustment method as claimed in claim 11, wherein the target value is 0.5.

15. The write adjustment method as claimed in claim 11, wherein the first mixing period data is composed of a 4T RF pattern and 14T RF pattern.

16. The write adjustment method as claimed in claim 11, wherein the second mixing period data is composed of a 3T RF pattern and a 14T RF pattern.

17. The write adjustment method as claimed in claim 11, wherein the third mixing period data is composed of 3T to 14T RF patterns.

18. The write adjustment method as claimed in claim 11, wherein the first short period data is 4T RF pattern and the second short period data is 3T RF pattern.

* * * * *